United States Patent
Aoyama et al.

(10) Patent No.: US 9,655,379 B2
(45) Date of Patent: May 23, 2017

(54) TOMATO KETCHUP

(75) Inventors: Hiroshi Aoyama, Sumida-ku (JP); Atsunobu Fujii, Cincinnati, OH (US); Yuki Kaneko, Kawasaki (JP); Shin Koike, Chiba (JP)

(73) Assignee: Kao Corporation, Tokyo (JP)

( * ) Notice: Subject to any disclaimer, the term of this patent is extended or adjusted under 35 U.S.C. 154(b) by 487 days.

(21) Appl. No.: 14/008,698

(22) PCT Filed: Mar. 30, 2012

(86) PCT No.: PCT/JP2012/058560
§ 371 (c)(1),
(2), (4) Date: Sep. 30, 2013

(87) PCT Pub. No.: WO2012/133759
PCT Pub. Date: Oct. 4, 2012

(65) Prior Publication Data
US 2014/0030417 A1    Jan. 30, 2014

(30) Foreign Application Priority Data

Mar. 30, 2011  (JP) .................................. 2011-074227
Mar. 29, 2012  (JP) .................................. 2012-077979

(51) Int. Cl.
A23L 1/24   (2006.01)
A23L 27/60  (2016.01)
A23L 27/40  (2016.01)
A23L 23/00  (2016.01)

(52) U.S. Cl.
CPC ............... *A23L 1/243* (2013.01); *A23L 27/63* (2016.08); *A23L 23/00* (2016.08); *A23L 27/45* (2016.08)

(58) Field of Classification Search
CPC ... A23L 1/39; A23L 1/24; A23L 1/243; A23L 23/00
USPC .................................................. 426/589, 650
See application file for complete search history.

(56) References Cited

U.S. PATENT DOCUMENTS 5,145,707 A *   9/1992 Lee ..................... A23L 1/237
                                                426/649
2002/0012735 A1   1/2002 Mikla et al.
2009/0104330 A1*  4/2009 Zasypkin ............. A23L 1/237
                                                426/534

FOREIGN PATENT DOCUMENTS

| CN | 1659981 A | 8/2005 |
|---|---|---|
| CN | 101902925 A | 12/2010 |
| JP | 2 174653 | 7/1990 |
| JP | 11 164673 | 6/1999 |
| JP | 2003-135020 | 5/2003 |
| JP | 2009 089659 | 4/2009 |
| JP | 2009 189266 | 8/2009 |
| JP | 2010 200617 | 9/2010 |
| KR | 10-0822448 B1 | 4/2008 |
| RU | 2 204 913 C1 | 5/2003 |
| WO | WO 2009/080768 A2 | 7/2009 |

OTHER PUBLICATIONS

Pennington "Food values of portions commonly used", Lippincott Williams and Wilkins publication, 17th Edition, 1998, p. 306.*
Hankin "Quality of Tomato Paste, Sauce, Puree and catsup", Jan. 1986—5 pages.*
Lehkozivova et al. "The Quality and Autheticity Markers of Tomato Ketchup" Acta Chimica Slovaca, vol. 2., No. 2, 2009, 88-96.*
Sodium potassium ratio linked to cardiovascular disease risk by www.nih.gov, Jan. 2009, 3 pages.*
Extended Search Report issued Aug. 28, 2014 in European Patent Application No. 12765815.1.
Wu Rong, et al., "Determination of Ca, Cu, Fe, Zn, Mn, K, Al, Sr, and P in Tomato Ketchup by ICP-AES" Chinese Journal of Spectroscopy Laboratory, vol. 17, No. 2, Mar. 2000, pp. 232-234 (with English Abstract).
Ukai N., "Chomiryo Koshinryo no Jiten", Dictionary of Seasoning, the spice, 1996, pp. 283-285, Jul. 15, 1991, (with partial English translation).
Munaf E., et al.,"Microcolumn ion chromatography of inorganic monovalent cations with indirect photometric detection and a silica gel column", Analytica Chimica Acta, vol. 334, pp. 39-43, (1996).
Rani, V. et al., "Nutrient compostion of tomato products prepared using tomato grown under sodic condition with gypsum and farmyard manure treatment", J. Sci. food Agric, vol. 89, pp. 2601-2607, (2009).
International Search Report issued Jun. 26, 2012 in PCT/JP12/058560 filed Mar. 30, 2012.

* cited by examiner

*Primary Examiner* — Jyoti Chawla
(74) *Attorney, Agent, or Firm* — Oblon, McClelland, Maier & Neustadt, L.L.P.

(57) ABSTRACT

A tomato ketchup containing the following components (A) to (C):

| (A) saccharide | from 12 to 31 mass %, |
|---|---|
| (B) potassium | from 0.6 to 1.9 mass %, and |
| (C) sodium | from 0.1 to 1.55 mass %. |

9 Claims, No Drawings

TOMATO KETCHUP

CROSS REFERENCE TO RELATED APPLICATION

This application is a 371 of PCT/JP2012/058560, filed on Mar. 30, 2012, and claims priority to the following Japanese Patent Applications: 2011-074227, filed on Mar. 30, 2011; and 2012-077979, filed on Mar. 29, 2012.

FIELD OF THE INVENTION

The present invention relates to tomato ketchup.

BACKGROUND OF THE INVENTION

Tomato ketchup is a processed tomato product seasoned by adding kitchen salt, spice, sugars, edible vinegar, vegetables and so forth to a tomato raw material, and it has a soluble solid content of 25% by mass or more.

In the process of producing the tomato ketchup, heat treatment such as germicidal treatment is ordinarily applied, but this heat treatment reduces a fresh flavor peculiar to tomatoes. Accordingly, conventional tomato ketchup lacks a fresh flavor of fresh tomatoes.

Meanwhile, a method for improving fresh feel of the processed tomato product has been also reported. For example, Patent Literature 1 discloses blending in finely-milled egg shell in order to obtain a tomato sauce having fresh feel of tomatoes. Moreover, Patent Literature 2 discloses addition of fermented alcoholic beverage using a citrus as a main raw material together with a tomato raw material in order to obtain a processed food in which a fresh flavor inherent to tomatoes is developed.

CITATION LIST

Patent Literatures

Patent Literature 1: JP-A-2009-089659 ("JP-A" means unexamined published Japanese patent application)
Patent Literature 2: JP-A-2009-189266

SUMMARY OF THE INVENTION

The present invention relates to a tomato ketchup containing the following components (A) to (C):

| | |
|---|---|
| (A) saccharide | from 12 to 31% by mass, |
| (B) potassium | from 0.6 to 1.9% by mass, and |
| (C) sodium | from 0.1 to 1.55% by mass. |

Other and further features and advantages of the invention will appear more fully from the following description.

DETAILED DESCRIPTION OF THE INVENTION

The present invention is contemplated for providing tomato ketchup having an enhanced fresh aroma sensed in raw tomatoes, and also excellent in a balance of tastes.

In view of the above, the present inventors diligently continued to conduct research, and as a result, found that, when the content of saccharide, potassium and sodium is adjusted in a specific range, tomato ketchup having enhanced peculiar fresh aroma of raw tomatoes, and also excellent in a balance of tastes can be produced. The present invention was completed based on this finding.

The tomato ketchup according to the present invention is described in detail below.

The tomato ketchup according to the present invention is a processed tomato product produced by blending at least a tomato raw material, sugars, sugar alcohols and/or polysaccharides, a potassium salt, and a sodium salt, and it has a soluble solid content of 25% by mass or more as measured at 20° C. using a sugar refractometer.

The tomato ketchup according to the present invention is ordinarily in the form of a pasty composition.

The tomato ketchup according to the present invention contains a specific amount of saccharide (component (A)). The amount of saccharide in the tomato ketchup is expressed in terms of a value calculated based on Nutrition Labeling Standards (Ministry of Health, Labour and Welfare Notification No. 176, 2003), and can be determined by deducting the total amount of water, protein, fat, dietary fiber and ash in the ketchup from the total amount of the tomato ketchup.

The content of the saccharide in the tomato ketchup according to the present invention is from 12 to 31% by mass, and in order to further complement a flavor and taste of a raw tomato and to improve unity of taste, the content of the saccharide is preferably from 21 to 30% by mass.

The saccharide contained in the tomato ketchup according to the present invention is a component mainly derived from the tomato raw material, sugars, the fruit juice and so forth that are blended in.

The tomato ketchup according to the present invention contains a specific amount of potassium (component (B)). The potassium means one present in the form of a salt in the tomato ketchup.

The content of the potassium in the tomato ketchup according to the present invention is from 0.6 to 1.9% by mass, and in order to further complement a flavor and taste of a raw tomato and to improve unity of taste, the content of the potassium is preferably from 0.6 to 1.6% by mass, more preferably from 0.6 to 1.5% by mass, more preferably from 0.7 to 1.5% by mass, and more preferably from 0.7 to 1.1% by mass.

The content of the potassium in the tomato ketchup according to the present invention means a total amount of potassium derived from a potassium salt blended in during the production of the tomato ketchup and potassium derived from other raw materials such as the tomato raw material, and can be measured using an atomic absorption spectrophotometer.

The tomato ketchup according to the present invention contains a specific amount of sodium (component (C)). The sodium means "sodium" or "Na" on food composition labeling, and means one present in the form of a salt in the tomato ketchup.

The content of the sodium in the tomato ketchup according to the present invention is 0.1 to 1.55% by mass, and in order to further complement a flavor and taste of a raw tomato and to improve unity of taste, the content of the sodium is preferably from 0.1 to 1.5% by mass, more preferably from 0.1 to 1.2% by mass, more preferably from 0.2 to 1.2% by mass, and more preferably from 0.2 to 1% by mass.

The content of the sodium in the tomato ketchup according to the present invention means a total amount of sodium derived from a sodium salt blended in during the production of the tomato ketchup and sodium derived from other raw materials such as the tomato raw material, and can be measured using an atomic absorption spectrophotometer.

With regard to the tomato ketchup according to the present invention, in order to further complement a flavor and taste of a raw tomato and to improve unity of taste, the ratio of the content of the potassium with respect to the content of the saccharide (potassium/saccharide, mass ratio) in the tomato ketchup is preferably from 0.021 to 0.09, and more preferably from 0.025 to 0.058.

Moreover, with regard to the tomato ketchup according to the present invention, in order to further complement a flavor and taste of a raw tomato and to improve unity of taste, the content x (% by mass) of the potassium and the content y (% by mass) of the sodium in the tomato ketchup satisfy preferably the formula (I) below, and further preferably, the formula (II) below.

$$-0.5x+0.6 \leq y \leq -0.9x+2.3 (x>0, y>0) \quad (I)$$

$$-0.5x+0.8 \leq y \leq -0.9x+1.8 (x>0, y>0) \quad (II)$$

Moreover, with regard to the tomato ketchup according to the present invention, from viewpoints of suppression of a stuffy smell after heating the ketchup in a microwave oven, suppression of a foreign taste derived from potassium, and an improvement of fragrance of an ingredient, the content y (% by mass) of the sodium with respect to the content x (% by mass) of the potassium (Na/K) in the tomato ketchup is preferably from 0.05 to 1.2, more preferably from 0.2 to 1, and more preferably from 0.5 to 0.9.

From a viewpoint of further enhancing a flavor, the tomato ketchup according to the present invention preferably contains aspartic acid or a salt thereof, or a combination thereof. Specific examples of the salts of aspartic acid include an acid addition salt with inorganic acid such as hydrochloric acid, hydrobromic acid, sulfuric acid, phosphoric acid and nitric acid, an acid addition salt with organic acid such as acetic acid, propionic acid, succinic acid, glycolic acid, lactic acid, malic acid, tartaric acid, citric acid, maleic acid, fumaric acid, methanesulfonic acid, benzenesulfonic acid, p-toluenesulfonic acid and ascorbic acid, a salt with an alkaline earth metal such as calcium, a salt with inorganic base such as ammonium, and a salt with organic base such as an amine and an alkanolamine. Specific examples of the amines include methylamine, diethylamine, triethylamine and ethylenediamine. Specific examples of the alkanolamines include monoethanolamine, diethanolamine and triethanolamine.

In a tomato-containing condiment, the content of the aspartic acid, the salt thereof, or the combination thereof is, in view of a flavor, preferably from 0.13 to 1.13% by mass, more preferably, 0.14 to 1% by mass, more preferably from 0.2 to 0.9% by mass, more preferably from 0.3 to 0.9% by mass, and more preferably from 0.6 to 0.9% by mass, in terms of an aspartic acid equivalent. The content in terms of an aspartic acid equivalent means a value measured using an amino acid analyzer as described in the after-mentioned Examples.

Specific examples of the tomato raw materials to be blended in the tomato ketchup according to the present invention include a fresh tomato, a whole tomato, a diced tomato, tomato puree, tomato paste and tomato juice. Namely, for the tomato ketchup according to the present invention, the fresh tomato, and also one prepared by heating, squeezing, braising or heat-sterilizing the fresh tomato, or the like can be used. Tomatoes (*Lycopersicum esculentum* P. Mill) used as a material of the tomato raw material is preferably a fully-ripened red fruit or a reddish tomato fruit.

The above-described whole tomato means one prepared by boiling a whole tomato in water.

The above-described diced tomato means one prepared by dicing a tomato with skin.

The above-described tomato puree means, among tomato concentrates, one having a salt-free soluble solid content of less than 24% by mass, or one prepared by adding a small amount of kitchen salt, spice, vegetables, lemon and/or a pH adjuster thereto, and having the salt-free soluble solid content of less than 24% by mass.

Moreover, the tomato paste refers to, among the tomato concentrates, one having the salt-free soluble solid content of 24% by mass or more, or one prepared by adding a small amount of kitchen salt, spice, vegetables, lemon and/or a pH adjuster thereto, and having the salt-free soluble solid content of 24% by mass or more.

The above-described tomato juice means one prepared by crushing and juicing a tomato, or pureeing a tomato, and removing skin, seeds and the like (hereinafter, referred to as tomato juice extract) or one prepared by adding kitchen salt thereto, or one prepared by diluting a tomato concentrate to be returned to a state of juice extract or one prepared by adding kitchen salt thereto.

The above-described tomato concentrate means one prepared by crushing and juicing a tomato, or pureeing a tomato, and removing skin, seeds and the like, and then concentrating the resultant product to be having the salt-free soluble solid content of 8% by mass or more.

In the above-described tomato concentrate, one in the form of powder and solid is excluded.

The tomato raw material used in the present invention may be heat-sterilized. The heat sterilization conditions are not particularly limited, but one heat-sterilized at 100° C. or lower for a period of time not exceeding 120 minutes is preferred, and one heat-sterilized at from 70 to 100° C. for from 10 seconds to 90 minutes is further preferred.

The tomato ketchup according to the present invention is produced using one kind or two or more kinds of tomato raw materials. The tomato raw material used in the present invention is preferably one kind or two or more kinds selected from tomato paste, tomato puree, and a tomato concentrate, and more preferably, tomato paste.

The amount of the above-described tomato raw material to be blended in the tomato ketchup according to the present invention is not particularly limited, but from a viewpoint of providing the ketchup with moderate tomato feeling, the tomato raw material is preferably blended in at a concentration of from 10 to 80% by mass (that means that blending is made to be from 10 to 80% by mass in a final concentration after blending all the raw materials, and so forth.). When the tomato raw material used in the present invention is one kind or two or more kinds selected from a fresh tomato, a whole tomato, a diced tomato and tomato juice, the tomato raw material is preferably blended in at a concentration of from 15 to 75% by mass, and more preferably, at a concentration of from 20 to 50% by mass. Moreover, when tomato puree is used as a tomato raw material, the tomato raw material is preferably blended in at a concentration of from 12 to 70% by mass, and more preferably, at a concentration of from 15 to 65% by mass. Moreover, when tomato paste is used as a tomato raw material, the tomato raw material is preferably blended in at a concentration of from 11 to 60% by mass, and more preferably, at a concentration of from 15 to 55% by mass.

The sugars, the sugar alcohols and/or the polysaccharides to be blended in the tomato ketchup according to the present invention are not particularly limited, and specific examples include very-refined sugar, soft brown sugar, granulated sugar, confectioner granulated sugar, yellow-granulated sugar, brown sugar, lump sugar, crystal sugar, Wasanbon sugar, sucrose glucose fructose liquid sugar, glucose, galactose, arabinose, fructose, maltose, trehalose, liquid sugar, invert sugar, sugar syrup, erythritol, xylitol, glycerol, sorbitol, reduced sugar syrup, starch, dextrin and the like. In the tomato ketchup according to the present invention, one kind or two or more kinds of components selected from sugars, sugar alcohols and polysaccharides are preferably blended in at a concentration of from 1 to 50% by mass, and more preferably, at a concentration of from 10 to 40% by mass.

The potassium salt to be blended in the tomato ketchup according to the present invention may be an inorganic potassium salt or a potassium salt of organic acid. Specific examples of the inorganic potassium salts include potassium chloride, monopotassium phosphate and dipotassium phosphate. Specific examples of the potassium salts of organic acid include a potassium salt of amino acid, a potassium salt of nucleic acid, such as potassium inosinate and potassium guanylate, and potassium gluconate, potassium succinate and potassium citrate. In the tomato ketchup according to the present invention, one kind or two or more kinds of the above-described potassium salts can be blended in, and from a cost aspect, potassium chloride can be suitably blended in.

In the tomato ketchup according to the present invention, the above-described potassium salt is blended in preferably at a concentration of from 0.1 to 10% by mass, more preferably, at a concentration of from 0.5 to 7% by mass, and more preferably, at a concentration of from 1 to 5% by mass.

The sodium salt to be blended in the tomato ketchup according to the present invention may be an inorganic sodium salt or a sodium salt of organic acid. Specific examples of the above-described inorganic sodium salts include sodium chloride, monosodium phosphate, and disodium phosphate. Specific examples of the above-described sodium salts of organic acid include a sodium salt of amino acid, a sodium salt of nucleic acids, such as sodium inosinate and sodium guanylate, and sodium gluconate, sodium succinate and trisodium citrate. In the tomato ketchup according to the present invention, one kind or two or more kinds of the above-described sodium salts can be blended in, and from a cost aspect, sodium chloride can be suitably blended in. For blending in the sodium salt, kitchen salt such as native salt, solar salt, rock salt and table salt may be blended in.

In the tomato ketchup according to the present invention, the above-described sodium salt is blended in preferably at a concentration of 0.01 to 10% by mass, more preferably, at a concentration of from 0.05 to 7% by mass, and more preferably, at a concentration of from 0.1 to 5% by mass.

In the tomato ketchup according to the present invention, spice may be blended in. The spice is not particularly limited, and specific examples include paprika, cinnamon, allspice, clove, chili pepper, nutmeg, thyme, laurel, Saigon cinnamon, sage and pepper, or an extract thereof. In the tomato ketchup according to the present invention, the spice is blended preferably at a concentration of from 0.01 to 5% by mass, and more preferably, at a concentration of from 0.05 to 3% by mass.

In the tomato ketchup according to the present invention, edible vinegar may be blended. The edible vinegar is not particularly limited, and specific examples include grain vinegar, fruit vinegar, rice vinegar, brewed vinegar, white vinegar, wine vinegar and apple vinegar. Moreover, high acidity vinegar prepared using the vinegar above as a raw material may also be used. In the tomato ketchup according to the present invention, the edible vinegar is blended in preferably at a concentration of from 1 to 30% by mass, and more preferably, at a concentration of from 3 to 20% by mass.

In the tomato ketchup according to the present invention, onion and/or garlic may be blended in. When the onion and the garlic are blended in the form of fine particles or paste, distribution thereof in the tomato ketchup becomes homogeneous, and tomato ketchup in the form of smooth paste is obtained. In the tomato ketchup according to the present invention, the onion and/or the garlic are blended in preferably at a concentration of from 0.01 to 10% by mass, and more preferably, at a concentration of from 0.05 to 5% by mass.

In the tomato ketchup according to the present invention, an acidulant may be blended in. The acidulant is not particular limited, and specific examples include citric acid, DL-malic acid, fruit juice of a citrus, acetic acid, succinic acid, fumaric acid, lactic acid, gluconic acid, phytic acid, tartaric acid and phosphoric acid.

In the tomato ketchup according to the present invention, a thickening agent may be blended in. The thickening agent is not particularly limited, and specific examples include a natural product such as a tamarind seed gum, pectin, a xanthan gum, carrageenan, a guar gum, a locust bean gum, a gellan gum, gum Mona, gum arabic, alginates, a tragacanth gum, polydextrose, celluloses, modified starches, pullulan, curdlan, gelatin, and a soybean polysaccharide, and gums of chemical compositions, such as carboxy methyl cellulose and polyethylene glycols.

In the tomato ketchup according to the present invention, various kinds of additives that can be used for food may be further blended in arbitrarily, such as vegetables, fruits, mushrooms, marine algae, fish and shellfish, meat, a processed meat product, a dairy product, cereal, eggs, edible oil, alcoholic beverages, an inorganic salt, sugars, a sweetener, an emulsifier, a preservative, a stabilizer, an antiseptic, an antioxidant, a viscosity improver, a coloring agent, essence and water.

The tomato ketchup according to the present invention can be produced according to an ordinary method, for example, can be obtained by mixing and homogenizing the above-mentioned raw materials. The tomato ketchup according to the present invention is preferably one filled and sterilized.

The soluble solid content of tomato ketchup according to the present invention is 25% by mass or more. The soluble solid content can be measured by the method described in Quality Labeling Standards for Foods of the Japanese Agricultural Standards (issued by Chuohoki Publishing Co., Ltd.). The soluble solid content of the tomato ketchup according to the present invention is preferably from 25 to 50% by mass, and more preferably from 25 to 45% by mass.

In the production of the tomato ketchup according to the present invention, heat treatment is applied in any one of steps, but the heat treatment is ordinarily applied at least in a sterilization step. Moreover, homogenization may be performed while heating the ketchup. Heating temperature is preferably from 70 to 100° C. The heat treatment is applied, more preferably at from 75 to 100° C. for from 10 seconds to 90 minutes, and more preferably at 80 to 100° C. for from 30 seconds to 60 minutes, from viewpoints of a flavor and sterilizing properties. Moreover, in the case of heating the ketchup in a sealing system (retort), heating temperature is preferably from 100 to 130° C., and heating time is preferably from 10 seconds to 20 minutes. The heating treatment is applied more preferably at from 100 to 120° C. and heating time is for from 20 seconds to 10 minutes, and more preferably at from 101 to 110° C. and heating time is for from 30 seconds to 8 minutes.

Specific examples of heating methods include (1) in the case of using a container that can be heat-sterilized, such as a retort pouch and a metal-can container, a method in which, after filling ketchup into the container, heat-sterilizing is conducted under sterilization conditions provided in the Food Sanitation Law; and (2) in the case of using a container that allows no retort sterilization, such as a PET bottle and a paper container, a method of filling tomato ketchup cooled to a predetermined temperature into the container after a step for sterilization under sterilization conditions in a manner similar to the above-described conditions, for example, after a step for sterilization using a plate type heat exchanger at a high temperature for a short period of time.

When the above-described heat treatment is applied, the tomato ketchup can be suitably sterilized and can be processed into the form of smoother paste. However, in tomato ketchup having a conventional composition, a fresh flavor and taste peculiar to raw tomatoes has been adversely affected, and a flavor of tomatoes has been indistinct.

In contrast, the tomato ketchup according to the present invention, even when the heat treatment is applied, the fresh flavor and taste peculiar to raw tomatoes can be sensed more distinctly.

In the tomato ketchup according to the present invention, the fresh flavor and taste sensed in the raw tomato is more conspicuous, and the flavor of the fresh tomato that has been indistinct in the conventional tomato ketchup can be sensed more distinctly, and simultaneously, flavor and taste of the tomato ketchup according to the present invention become unified.

The tomato ketchup according to the present invention can be widely used for seasoning of various kinds of food or food materials.

With regard to the above-mentioned embodiments, the present invention further discloses tomato ketchup as described below.

<1> A Tomato Ketchup Containing the following Components (A) to (C):

| (A) saccharide | from 12 to 31% by mass, |
| (B) potassium | from 0.6 to 1.9% by mass, and |
| (C) sodium | from 0.1 to 1.55% by mass. |

<2> The tomato ketchup according to <1>, wherein the content of the potassium with respect to the content of the saccharide (potassium/saccharide, mass ratio) is from 0.021 to 0.09, preferably from 0.025 to 0.058.

<3> The tomato ketchup according to <1> or <2>, wherein the content x (% by mass) of the potassium and the content y (% by mass) of the sodium satisfy the following formula (I), preferably the following formula (II):

$$-0.5x+0.6 \leq y \leq -0.9x+2.3 (x>0, y>0) \quad (I),$$

$$-0.5x+0.8 \leq y \leq -0.9x+1.8 (x>0, y>0) \quad (II).$$

<4> The tomato ketchup according to any one of <1> to <3>, wherein the content of the sodium with respect to the content of the potassium (sodium/potassium, mass ratio) is 0.05 or more, preferably 0.2 or more, more preferably 0.5 or more.

<5> The tomato ketchup according to any one of <1> to <4>, wherein the content of the sodium with respect to the content of the potassium (sodium/potassium, mass ratio) is 1.2 or less, preferably 1 or less, more preferably 0.9 or less.

<6> The tomato ketchup according to any one of <1> to <5>, wherein the tomato ketchup contains aspartic acid or a salt thereof, or a combination thereof in an amount of 0.13% by mass or more, preferably 0.14% by mass or more, more preferably 0.2% by mass or more, more preferably 0.3% by mass or more, more preferably 0.6% by mass or more in terms of aspartic acid equivalent.

<7> The tomato ketchup according to any one of <1> to <6>, wherein the tomato ketchup contains aspartic acid or a salt thereof, or a combination thereof in an amount of 1.13% by mass or less, preferably 1% by mass or less, more preferably 0.9% by mass or less in terms of aspartic acid equivalent.

<8> The tomato ketchup according to any one of <1> to <7>, wherein the content of the saccharide is 21% by mass or more.

<9> The tomato ketchup according to any one of <1> to <8>, wherein the content of the saccharide is 30% by mass or less.

<10> The tomato ketchup according to any one of <1> to <9>, wherein the content of the potassium is 0.6% by mass or more, preferably 0.7% by mass or more.

<11> The tomato ketchup according to any one of <1> to <10>, wherein the content of the potassium is 1.6% by mass or less, preferably 1.5% by mass or less, more preferably 1.1% by mass or less.

<12> The tomato ketchup according to any one of <1> to <11>, wherein the content of the sodium is 0.1% by mass or more, preferably 0.2% by mass or more.

<13> The tomato ketchup according to any one of <1> to <12>, wherein the content of the sodium is 1.5% by mass or less, preferably 1.2% by mass or less, more preferably 1% by mass or less.

<14> The tomato ketchup according to any one of <1> to <13>, wherein the amount of a soluble solid content is 25% by mass or more, preferably from 25 to 50% by mass, more preferably from 25 to 45% by mass.

<15> The tomato ketchup according to any one of <1> to <14>, wherein the tomato ketchup contains one kind or two or more kinds of tomato raw materials selected from a fresh tomato, a whole tomato, a diced tomato, tomato puree, tomato paste and tomato juice.

<16> The tomato ketchup according to any one of <1> to <15>, wherein a tomato raw material is blended in at a concentration of from 10 to 80% by mass.

<17> The tomato ketchup according to <16>, wherein the tomato raw material is one kind or two or more kinds selected from a fresh tomato, a whole tomato, a diced tomato, and tomato juice, and the tomato raw material is blended in at a concentration of from 15 to 75% by mass, more preferably from 20 to 50% by mass.

<18> The tomato ketchup according to <16>, wherein the tomato raw material is tomato puree, and the tomato raw material is blended in at a concentration of from 12 to 70% by mass, preferably from 15 to 65% by mass.

<19> The tomato ketchup according to <16>, wherein the tomato raw material is tomato paste, and the tomato raw material is blended in at a concentration of from 11 to 60% by mass, more preferably from 15 to 55% by mass.

<20> The tomato ketchup according to any one of <1> to <19>, wherein one kind or two or more kinds of components selected from sugars, sugar alcohols and polysaccharides are blended in at a concentration of 1 to 50% by mass, preferably 10 to 40% by mass in total.

<21> The tomato ketchup according to any one of <1> to <20>, wherein a potassium salt is blended in at a concentration of 0.1% by mass or more, preferably 0.5% by mass or more, more preferably 1% by mass or more.

<22> The tomato ketchup according to any one of <1> to <21>, wherein a potassium salt is blended in at a concentration of 10% by mass or less, preferably 7% by mass or less, more preferably 5% by mass or less.

<23> The tomato ketchup according to <21> or <22>, wherein the potassium salt is an inorganic potassium salt or a potassium salt of an organic acid.

<24> The tomato ketchup according to any one of <1> to <23>, wherein a sodium salt is blended in at a concentration of 0.01% by mass or more, preferably 0.05% by mass or more, more preferably 0.1% by mass or more.

<25> The tomato ketchup according to any one of <1> to <24>, wherein a sodium salt is blended in at a concentration of 10% by mass or less, preferably 7% by mass or less, more preferably 5% by mass or less.

<26> The tomato ketchup according to <24> or <25>, wherein the sodium salt is an inorganic sodium salt or a sodium salt of an organic acid.

<27> The tomato ketchup according to any one of <1> to <26>, wherein spice is blended in at a concentration of from 0.01 to 5% by mass, preferably from 0.05 to 3% by mass.

<28> The tomato ketchup according to any one of <1> to <27>, wherein edible vinegar is blended in at a concentration of from 1 to 30% by mass, preferably from 3 to 20% by mass.

<29> The tomato ketchup according to any one of <1> to <28>, wherein an onion or a garlic, or a combination thereof is blended in at a concentration of from 0.01 to 10% by mass, preferably from 0.05 to 5% by mass.

EXAMPLES

Hereinafter, the present invention will be described more in detail with reference to Examples, but the present invention is not limited thereto.

[Analytical Method]

Measurement of Content of Saccharide:

In accordance with the method described in "Analytical Manual for Standard Tables of Food Composition in Japan, 5th revised edition (Chuohoki Publishing Co., Ltd.), water in tomato ketchup was measured by a vacuum heating drying method, protein was measured by a Kjeldahl method, fat was measured by an acid hydrolysis method, dietary fiber was measured by an enzymatic-gravimetric method, and the ash content was measured by a dry ashing method. The content of saccharide was determined by deducting a total amount of water, protein, fat, dietary fiber, and ash content from a total amount of tomato ketchup.

Measurement of Content of Potassium (K) and Sodium (Na):

The content was calculated by measuring the content of Na and K using an atomic absorption spectrophotometer (Polarized Zeeman Atomic Absorption Spectrophotometer, Hitachi Z-6100).

Measurement of Soluble Solid Content (Brix):

Measurement was carried out at 20° C. by using a sugar refractometer (digital saccharimeter IPR-201α, manufactured by As One Corporation).

Measurement of Aspartic Acid

The content of aspartic acid was measured using a high-speed amino acid analyzer (L-8800A, Hitachi High-Technologies Corporation), and the content of aspartic acid in tomato ketchup was calculated.

Preparation Example 1

Preparation of Tomato Ketchup-1

Tomato paste (manufactured by KAGOME Co., Ltd.), sodium chloride (NaCl, manufactured by Wako Pure Chemical Industries, Ltd.), potassium chloride (KCl, manufactured by Wako Pure Chemical Industries, Ltd.), brewed vinegar (manufactured by Mizkan Group Corporation), reduced sugar syrup (manufactured by Mitsubishi Shoji Foodtech Co., Ltd.), onion, spice, and water were blended in formulations described in Table 1 below (a unit of blending amount in Table 1: part by mass), the resultant mixture was sufficiently stirred and homogenized using a homogenizer (ULTRA DISPERSER LK-22, manufactured by YAMATO SCIENTIFIC CO., LTD.), and subjected to heat treatment at 90° C. for 5 minutes, and thus various kinds of tomato ketchup were obtained in which the content of sodium in the tomato ketchup was 0.6% by mass (Present Inventions (1) to (20) and Comparative Products (1) to (22)). In addition, the Table below simultaneously presents the content (% by mass) of soluble solid, saccharide, potassium, and sodium, potassium/saccharide, and sodium/potassium (all in terms of mass ratios) in the tomato ketchup obtained. Moreover, the Table presents fulfillment of each formula in columns of formula (I), and formula (II). "Y" stands for satisfaction of conditions of each formula. "N" stands for no satisfaction.

TABLE 1

| Tomato paste | Sodium chloride | Brewed vinegar | Spice | Onion | Reduced sugar syrup | Potassium chloride | Water | Brix (mass %) | Saccharide (mass %) | Potassium (mass %) | Sodium (mass %) | K/Saccharide (mass ratio) | Na/K (mass ratio) | Tomato ketchup | Formula (I) | Formula (II) | Fresh feel | Taste |
|---|---|---|---|---|---|---|---|---|---|---|---|---|---|---|---|---|---|---|
| 35.0 | 1.5 | 5.0 | 0.7 | 2.3 | 6.4 | 0.0 | 49.1 | 22 | 11 | 0.4 | 0.6 | 0.036 | 1.50 | Comparative product (1) | Y | Y | 1 | 1 |
| | | | | | | 0.3 | 48.8 | | 11 | 0.6 | 0.6 | 0.055 | 1.00 | Comparative product (2) | Y | Y | 1 | 1 |
| | | | | | | 0.5 | 48.6 | | 11 | 0.7 | 0.6 | 0.064 | 0.86 | Comparative product (3) | Y | Y | 1 | 2 |
| | | | | | | 1.3 | 47.8 | | 11 | 1.1 | 0.6 | 0.100 | 0.55 | Comparative product (4) | Y | N | 2 | 2 |
| | | | | | | 2.1 | 47.0 | | 11 | 1.5 | 0.6 | 0.136 | 0.40 | Comparative product (5) | Y | N | 2 | 2 |
| | | | | | | 2.3 | 46.8 | | 11 | 1.6 | 0.6 | 0.145 | 0.38 | Comparative product (6) | Y | N | 1 | 1 |
| | | | | | | 3.0 | 46.1 | | 11 | 2.0 | 0.6 | 0.182 | 0.30 | Comparative product (7) | Y | N | 1 | 1 |
| | | | | | 12.9 | 0.0 | 42.6 | 27 | 16 | 0.4 | 0.6 | 0.025 | 1.50 | Comparative product (8) | Y | Y | 2 | 3 |
| | | | | | | 0.3 | 42.3 | | 16 | 0.6 | 0.6 | 0.038 | 1.00 | Present Invention(1) | Y | Y | 6 | 5 |
| | | | | | | 0.5 | 42.1 | | 16 | 0.7 | 0.6 | 0.044 | 0.86 | Present Invention(2) | Y | Y | 6 | 5 |
| | | | | | | 1.3 | 41.3 | | 16 | 1.1 | 0.6 | 0.069 | 0.55 | Present Invention(3) | Y | Y | 5 | 4 |
| | | | | | | 2.1 | 40.5 | | 16 | 1.5 | 0.6 | 0.094 | 0.40 | Present Invention(4) | Y | Y | 4 | 4 |
| | | | | | | 2.3 | 40.3 | | 16 | 1.6 | 0.6 | 0.100 | 0.38 | Present Invention(5) | Y | Y | 4 | 4 |
| | | | | | | 3.0 | 39.6 | | 16 | 2.0 | 0.6 | 0.125 | 0.30 | Comparative product (9) | Y | N | 2 | 1 |
| | | | | | 19.3 | 0.0 | 36.2 | 31 | 21 | 0.4 | 0.6 | 0.019 | 1.50 | Comparative product (10) | N | Y | 3 | 3 |
| | | | | | | 0.3 | 35.9 | | 21 | 0.6 | 0.6 | 0.029 | 1.00 | Present Invention(6) | Y | Y | 6 | 6 |
| | | | | | | 0.5 | 35.7 | | 21 | 0.7 | 0.6 | 0.033 | 0.86 | Present Invention(7) | Y | Y | 6 | 6 |
| | | | | | | 1.3 | 34.9 | | 21 | 1.1 | 0.6 | 0.052 | 0.55 | Present Invention(8) | Y | Y | 6 | 6 |
| | | | | | | 2.1 | 34.1 | | 21 | 1.5 | 0.6 | 0.071 | 0.40 | Present Invention(9) | Y | Y | 5 | 5 |
| | | | | | | 2.3 | 33.9 | | 21 | 1.6 | 0.6 | 0.076 | 0.38 | Present Invention(10) | Y | Y | 5 | 4 |
| | | | | | | 3.0 | 33.2 | | 21 | 2.0 | 0.6 | 0.095 | 0.30 | Comparative product (11) | N | N | 3 | 2 |
| | | | | | 26.6 | 0.0 | 28.9 | 37 | 27 | 0.4 | 0.6 | 0.015 | 1.50 | Comparative product (12) | Y | Y | 3 | 4 |
| | | | | | | 0.3 | 28.6 | | 27 | 0.6 | 0.6 | 0.022 | 1.00 | Present Invention(11) | Y | Y | 5 | 5 |
| | | | | | | 0.5 | 28.4 | | 27 | 0.7 | 0.6 | 0.026 | 0.86 | Present Invention(12) | Y | Y | 5 | 6 |
| | | | | | | 1.3 | 27.6 | | 27 | 1.1 | 0.6 | 0.041 | 0.55 | Present Invention(13) | Y | Y | 6 | 6 |
| | | | | | | 2.1 | 26.8 | | 27 | 1.5 | 0.6 | 0.056 | 0.40 | Present Invention(14) | Y | Y | 6 | 5 |
| | | | | | | 2.3 | 26.6 | | 27 | 1.6 | 0.6 | 0.059 | 0.38 | Present Invention(15) | Y | Y | 5 | 4 |
| | | | | | | 3.0 | 25.9 | | 27 | 2.0 | 0.6 | 0.074 | 0.30 | Comparative product (13) | Y | N | 3 | 2 |
| | | | | | 30.1 | 0.0 | 25.4 | 40 | 30 | 0.4 | 0.6 | 0.013 | 1.50 | Comparative product (14) | N | Y | 3 | 3 |
| | | | | | | 0.3 | 25.1 | | 30 | 0.6 | 0.6 | 0.020 | 1.00 | Present Invention(16) | Y | Y | 4 | 4 |
| | | | | | | 0.5 | 24.9 | | 30 | 0.7 | 0.6 | 0.023 | 0.86 | Present Invention(17) | Y | Y | 5 | 5 |
| | | | | | | 1.3 | 24.1 | | 30 | 1.1 | 0.6 | 0.037 | 0.55 | Present Invention(18) | Y | Y | 6 | 5 |
| | | | | | | 2.1 | 23.3 | | 30 | 1.5 | 0.6 | 0.050 | 0.40 | Present Invention(19) | Y | Y | 6 | 5 |
| | | | | | | 2.3 | 23.1 | | 30 | 1.6 | 0.6 | 0.053 | 0.38 | Present Invention(20) | Y | Y | 6 | 3 |
| | | | | | | 3.0 | 22.4 | | 30 | 2.0 | 0.6 | 0.067 | 0.30 | Comparative product (15) | N | N | 3 | 3 |
| | | | | | 32.2 | 0.0 | 23.3 | 41 | 32 | 0.4 | 0.6 | 0.013 | 1.50 | Comparative product (16) | Y | Y | 3 | 4 |
| | | | | | | 0.3 | 23.0 | | 32 | 0.6 | 0.6 | 0.019 | 1.00 | Comparative product (17) | Y | Y | 4 | 4 |
| | | | | | | 0.5 | 22.8 | | 32 | 0.7 | 0.6 | 0.022 | 0.86 | Comparative product (18) | Y | Y | 5 | 5 |
| | | | | | | 1.3 | 22.0 | | 32 | 1.1 | 0.6 | 0.034 | 0.55 | Comparative product (19) | Y | Y | 6 | 4 |
| | | | | | | 2.1 | 21.2 | | 32 | 1.5 | 0.6 | 0.047 | 0.40 | Comparative product (20) | Y | Y | 4 | 3 |
| | | | | | | 2.3 | 21.0 | | 32 | 1.6 | 0.6 | 0.050 | 0.38 | Comparative product (21) | Y | N | 3 | 3 |
| | | | | | | 3.0 | 20.3 | | 32 | 2.0 | 0.6 | 0.063 | 0.30 | Comparative product (22) | N | N | 2 | 2 |

Testing Example 1

Sensory Evaluation of Tomato Ketchup-1

With regard to each of the tomato ketchup obtained in the above-described Preparation Example 1, fresh feel and unity of taste (balance of tastes) were evaluated based on the following evaluation criteria, respectively. Numerical values of evaluation were determined by five specialist panels.

Evaluation Criteria of Fresh Feel:

8: Presence of very strong sense of a fresh flavor and taste to be sensed in a raw tomato.

7: Presence of satisfactorily strong sense of a fresh flavor and taste to be sensed in a raw tomato.

6: Presence of strong sense of a fresh flavor and taste to be sensed in a raw tomato.

5: Presence of somewhat strong sense of a fresh flavor and taste to be sensed in a raw tomato.

4: Presence of sense of a fresh flavor and taste to be sensed in a raw tomato.

3: Presence of not so strong sense of a fresh flavor and taste to be sensed in a raw tomato.

2: Almost no sense of a fresh flavor and taste to be sensed in a raw tomato.

1: No sense of a fresh flavor and taste to be sensed in a raw tomato.

Evaluation Criteria of Unity of Taste:

6: Very good balance regarding a salty taste, a delicious taste, a sweet taste and a sour taste.

5: Satisfactorily good balance regarding a salty taste, a delicious taste, a sweet taste and a sour taste.

4: Good balance regarding a salty taste, a delicious taste, a sweet taste, and a sour taste.

3: Somewhat lost balance regarding a salty taste, a delicious taste, a sweet taste and a sour taste.

2: Further lost balance regarding a salty taste, a delicious taste, a sweet taste and a sour taste.

1: Poor balance regarding a salty taste, a delicious taste, a sweet taste and a sour taste.

Table 1 above represents the results.

Table 1 shows that identity of tomato ketchup was not sensed in Comparative Products (1) to (7) in which the content of saccharide is lower than the one defined in the present invention. Either one or both of fresh feel and unity of taste were poorer in Comparative Products (16) to (22) in which the content of saccharide is higher than the definition of the present invention, Comparative Products (8), (10), (12), and (14) in which the content of potassium is lower than the definition of the present invention, and Comparative Products (9), (11), (13), and (15) in which the content of potassium is higher than the definition of the present invention.

On the other hand, evaluations superior to a predetermined level were obtained with regard to all of fresh feel and unity of taste in Present Inventions (1) to (20) in which all of the content of saccharide, potassium, and sodium are within the ranges defined in the present invention.

Moreover, among Present Inventions (1) to (20), a higher evaluation was obtained with regard to fresh feel of tomato and unity of taste in ones in which a ratio of the content of potassium to the content of saccharide (K/saccharide, mass ratio) is within a predetermined range.

Preparation Example 2

Preparation of Tomato Ketchup-2

Each raw material was blended in formulations described in Table 2 below (a unit of blending amount in Table 2: part by mass), the resultant mixture was sufficiently stirred and homogenized using a homogenizer (ULTRA DISPERSER LK-22, manufactured by YAMATO SCIENTIFIC CO., LTD.), and subjected to heat treatment at 90° C. for 5 minutes, and thus various kinds of tomato ketchup were obtained (Present Inventions (21) to (52), and Comparative Products (23) to (34)).

TABLE 2

| Tomato paste | Reduced sugar syrup | Brewed vinegar | Spice | Onion | Water | Potassium chloride | Sodium chloride | Brix (mass %) | Saccharide (mass %) | Potassium (mass %) | Sodium (mass %) | K/Saccharide (mass ratio) | Na/K (mass ratio) | Tomato ketchup | Formula (I) | Formula (II) | Fresh feel | Taste |
|---|---|---|---|---|---|---|---|---|---|---|---|---|---|---|---|---|---|---|
| 35.0 | 19.3 | 5.0 | 0.7 | 2.3 | 36.1 | 1.3 | 0.3 | 31 | 21 | 1.1 | 0.1 | 0.052 | 0.09 | Present Invention (21) | Y | N | 5 | 4 |
| | | | | | 36.9 | 0.3 | 0.5 | | | 0.6 | 0.2 | 0.029 | 0.33 | Present Invention (22) | Y | N | 4 | 4 |
| | | | | | 36.7 | 0.5 | 0.5 | | | 0.7 | 0.2 | 0.033 | 0.29 | Present Invention (23) | Y | N | 4 | 4 |
| | | | | | 35.9 | 1.3 | 0.5 | | | 1.1 | 0.2 | 0.052 | 0.18 | Present Invention (24) | Y | N | 5 | 5 |
| | | | | | 35.1 | 2.1 | 0.5 | | | 1.5 | 0.2 | 0.071 | 0.13 | Present Invention (25) | Y | Y | 6 | 5 |
| | | | | | 34.9 | 2.3 | 0.5 | | | 1.6 | 0.2 | 0.076 | 0.13 | Present Invention (26) | Y | N | 6 | 5 |
| | | | | | 36.6 | 0.3 | 0.8 | | | 0.6 | 0.3 | 0.029 | 0.50 | Present Invention (27) | Y | N | 5 | 4 |
| | | | | | 36.4 | 0.3 | 1.0 | | | 0.6 | 0.4 | 0.029 | 0.67 | Present Invention (28) | Y | N | 5 | 4 |
| | | | | | 36.2 | 0.5 | 1.0 | | | 0.7 | 0.4 | 0.033 | 0.57 | Present Invention (29) | Y | N | 5 | 5 |
| | | | | | 35.4 | 1.3 | 1.0 | | | 1.1 | 0.4 | 0.052 | 0.36 | Present Invention (30) | Y | Y | 6 | 6 |
| | | | | | 34.6 | 2.1 | 1.0 | | | 1.5 | 0.4 | 0.071 | 0.27 | Present Invention (31) | Y | Y | 6 | 6 |
| | | | | | 34.4 | 2.3 | 1.0 | | | 1.6 | 0.4 | 0.076 | 0.25 | Present Invention (32) | Y | N | 5 | 6 |
| | | | | | 35.9 | 0.3 | 1.5 | | | 0.6 | 0.6 | 0.029 | 1.00 | Present Invention (33) | Y | N | 6 | 6 |
| | | | | | 35.7 | 0.5 | 1.5 | | | 0.7 | 0.6 | 0.033 | 0.86 | Present Invention (34) | Y | Y | 6 | 6 |
| | | | | | 34.9 | 1.3 | 1.5 | | | 1.1 | 0.6 | 0.052 | 0.55 | Present Invention (35) | Y | Y | 6 | 6 |
| | | | | | 34.1 | 2.1 | 1.5 | | | 1.5 | 0.6 | 0.071 | 0.40 | Present Invention (36) | Y | Y | 5 | 5 |
| | | | | | 33.9 | 2.3 | 1.5 | | | 1.6 | 0.6 | 0.076 | 0.38 | Present Invention (37) | Y | N | 5 | 4 |
| | | | | | 34.9 | 0.3 | 2.5 | | | 0.6 | 1.0 | 0.029 | 1.67 | Present Invention (38) | Y | Y | 6 | 6 |
| | | | | | 34.7 | 0.5 | 2.5 | | | 0.7 | 1.0 | 0.033 | 1.43 | Present Invention (39) | Y | Y | 6 | 6 |
| | | | | | 33.9 | 1.3 | 2.5 | | | 1.1 | 1.0 | 0.052 | 0.91 | Present Invention (40) | Y | Y | 5 | 5 |
| | | | | | 33.1 | 2.1 | 2.5 | | | 1.5 | 1.0 | 0.071 | 0.67 | Present Invention (41) | N | Y | 4 | 4 |
| | | | | | 32.9 | 2.3 | 2.5 | | | 1.6 | 1.0 | 0.076 | 0.63 | Present Invention (42) | N | N | 4 | 4 |
| | | | | | 34.4 | 0.3 | 3.0 | | | 0.6 | 1.2 | 0.029 | 2.00 | Present Invention (43) | Y | Y | 6 | 6 |
| | | | | | 34.2 | 0.5 | 3.0 | | | 0.7 | 1.2 | 0.033 | 1.71 | Present Invention (44) | Y | Y | 5 | 4 |
| | | | | | 33.4 | 1.3 | 3.0 | | | 1.1 | 1.2 | 0.052 | 1.09 | Present Invention (45) | Y | N | 5 | 4 |
| | | | | | 32.6 | 2.1 | 3.0 | | | 1.5 | 1.2 | 0.071 | 0.80 | Present Invention (46) | N | N | 4 | 4 |
| | | | | | 32.4 | 2.3 | 3.0 | | | 1.6 | 1.2 | 0.076 | 0.75 | Present Invention (47) | N | N | 4 | 4 |
| | | | | | 33.6 | 0.3 | 3.8 | | | 0.6 | 1.5 | 0.029 | 2.50 | Present Invention (48) | Y | Y | 5 | 4 |
| | | | | | 33.4 | 0.5 | 3.8 | | | 0.7 | 1.5 | 0.033 | 2.14 | Present Invention (49) | Y | N | 5 | 4 |
| | | | | | 32.6 | 1.3 | 3.8 | | | 1.1 | 1.5 | 0.052 | 1.36 | Present Invention (50) | N | N | 4 | 4 |
| | | | | | 31.8 | 2.1 | 3.8 | | | 1.5 | 1.5 | 0.071 | 1.00 | Present Invention (51) | N | N | 4 | 4 |
| | | | | | 31.6 | 2.3 | 3.8 | | | 1.6 | 1.5 | 0.076 | 0.94 | Present Invention (52) | N | N | 4 | 4 |
| | | | | | 37.7 | 0.0 | 0.0 | | | 0.4 | 0.02 | 0.020 | 0.04 | Comparative product (23) | N | N | 3 | 3 |
| | | | | | 36.4 | 1.3 | 0.0 | | | 1.1 | 0.02 | 0.052 | 0.01 | Comparative product (24) | N | N | 2 | 2 |
| | | | | | 37.2 | 0.0 | 0.5 | | | 0.4 | 0.2 | 0.020 | 0.48 | Comparative product (25) | N | N | 3 | 3 |
| | | | | | 36.7 | 0.0 | 1.0 | | | 0.4 | 0.4 | 0.020 | 0.95 | Comparative product (26) | Y | Y | 3 | 3 |
| | | | | | 36.2 | 0.0 | 1.5 | | | 0.4 | 0.6 | 0.020 | 1.43 | Comparative product (27) | Y | Y | 3 | 4 |
| | | | | | 35.2 | 0.0 | 2.5 | | | 0.4 | 1.0 | 0.020 | 2.38 | Comparative product (28) | Y | Y | 3 | 5 |
| | | | | | 34.7 | 0.0 | 3.0 | | | 0.4 | 1.2 | 0.020 | 2.85 | Comparative product (29) | Y | Y | 3 | 4 |
| | | | | | 33.9 | 0.0 | 3.8 | | | 0.4 | 1.5 | 0.020 | 3.56 | Comparative product (30) | Y | N | 3 | 4 |
| | | | | | 32.3 | 1.3 | 4.1 | | | 1.1 | 1.6 | 0.052 | 1.45 | Comparative product (31) | Y | N | 3 | 2 |
| | | | | | 34.7 | 3.0 | 0.0 | | | 2.0 | 0.02 | 0.095 | 0.01 | Comparative product (32) | Y | N | 1 | 1 |
| | | | | | 33.2 | 3.0 | 1.5 | | | 2.0 | 0.6 | 0.095 | 0.30 | Comparative product (33) | N | N | 3 | 3 |
| | | | | | 31.7 | 3.0 | 3.0 | | | 2.0 | 1.2 | 0.095 | 0.60 | Comparative product (34) | N | N | 3 | 2 |

Testing Example 2

Sensory Evaluation of Tomato Ketchup-2

With regard to each of the tomato ketchup obtained in the above-described Preparation Example 2, fresh feel and unity of taste were evaluated based on the above-described evaluation criteria, respectively. Numerical values of evaluation were determined by five specialist panels.

Table 2 above presents the results.

Table 2 shows that either one or both of fresh feel and unity of taste were poorer in Comparative Products (23) and (25) to (30) in which the content of potassium was lower than the definition of the present invention, and Comparative Products (32) to (34) in which the content of potassium is further increased than the definition of the present invention. Moreover, either one or both of fresh feel and unity of taste were also poorer in Comparative Products (24) and (31) in which, even if the content of potassium is within the range defined in the present invention, the content of sodium is outside the ranges defined in the present invention.

On the other hand, all of fresh feel and unity of taste were superb in Present Inventions (21) to (52) in which all of the content of saccharide, potassium, and sodium are within the ranges defined in the present invention.

Moreover, among Present Inventions (21) to (52), when the content of potassium and the content of sodium have a specific relationship, such products had further enhanced fresh feel of tomatoes, and possessed a good taste.

Preparation Example 3

Preparation of Tomato Ketchup-3

Each raw material was blended in formulations described in Table 3 below (a unit of blending amount in Table 3: part by mass), the resultant mixture was sufficiently stirred and homogenized using a homogenizer (ULTRA DISPERSER LK-22, manufactured by YAMATO SCIENTIFIC CO., LTD.), and subjected to heat treatment at 90° C. for 5 minutes, and thus various kinds of tomato ketchup were obtained (Present Inventions (53) to (58), and Comparative Product (35)).

TABLE 3

| Tomato Paste | Reduced sugar syrup | Brewed vinegar | Spice | Onion | Water | Potassium chloride | Sodium chloride | Brix (mass %) | Saccharide (mass %) | Potassium (mass %) | Sodium (mass %) |
|---|---|---|---|---|---|---|---|---|---|---|---|
| 35.0 | 19.3 | 5.0 | 0.7 | 2.3 | 36.1 | 1.3 | 0.3 | 31 | 21 | 1.1 | 0.1 |
| | | | | | 35.2 | 1.5 | 1.0 | | | 1.2 | 0.4 |
| | | | | | 34.9 | 1.3 | 1.5 | | | 1.1 | 0.6 |
| | | | | | 34.6 | 1.0 | 2.1 | | | 0.9 | 0.8 |
| | | | | | 33.4 | 1.3 | 3.0 | | | 1.1 | 1.2 |
| | | | | | 32.6 | 0.6 | 2.5 | | | 0.7 | 1.0 |
| | | | | | 34.7 | 0.0 | 3.0 | | | 0.4 | 1.2 |

| Tomato Paste | K/Saccharide (mass ratio) | Na/K (mass ratio) | Tomato ketchup | Formula (I) | Formula (II) | Before Microwave heating | | After microwave heating | | |
|---|---|---|---|---|---|---|---|---|---|---|
| | | | | | | Fresh feeling | Taste | Stuffy smell | Fragrance of ingredient | foreign taste |
| 35.0 | 0.052 | 0.09 | Present invention (53) | Y | N | 5 | 4 | 4 | 3 | 3 |
| | 0.057 | 0.33 | Present invention (54) | Y | Y | 6 | 6 | 4 | 3 | 4 |
| | 0.052 | 0.55 | Present invention (55) | Y | Y | 6 | 6 | 4 | 4 | 4 |
| | 0.043 | 0.89 | Present invention (56) | Y | Y | 6 | 6 | 3.5 | 4 | 4 |
| | 0.052 | 1.1 | Present invention (57) | Y | N | 5 | 4 | 3 | 4 | 4 |
| | 0.034 | 1.4 | Present invention (58) | Y | Y | 6 | 6 | 2 | 3 | 4 |
| | 0.019 | 3.0 | Comparative product (35) | Y | Y | 3 | 5 | 1 | 3 | 5 |

Testing Example 3

Sensory Evaluation of Tomato Ketchup-3

With regard to each of the tomato ketchup obtained in the above-described Preparation Example 3, fresh feel and unity of taste were evaluated based on the above-described evaluation criteria, respectively. Further, 10 g of each of tomato ketchup was filled into a 20 mL glass sample bottle, and a lid was closed, and then heating was made at 600 W 10 seconds in a microwave oven. A stuffy smell, a foreign taste, and fragrance of an ingredient of tomato ketchup after cooling were evaluated based on the following evaluation criteria, respectively. Numerical values of evaluation were determined by five specialist panels.

Table 3 above presents the results.

Evaluation criteria of stuffy smell:

5: No sense of stuffy smell.

4: Almost no sense of stuffy smell.

3: Presence of slight sense of stuffy smell.
2: Presence of sense of stuffy smell.
1: Presence of strong sense of stuffy smell.

Evaluation criteria of Fragrance of Ingredient:
5: Presence of strong sense of fragrance of onion or spice.
4: Presence of somewhat strong sense of fragrance of onion or spice.
3: Presence of slight sense of fragrance of onion or spice.
2: Almost no sense of fragrance of onion or spice.
1: No sense of fragrance of onion or spice.

Evaluation Criteria of Foreign Taste:
5: No sense of foreign taste derived from potassium.
4: Almost no sense of foreign taste derived from potassium.
3: Presence of slight sense of foreign taste derived from potassium.
2: Presence of sense of foreign taste derived from potassium.
1: Presence of strong sense of foreign taste derived from potassium.

Table 3 shows that fresh feel and a better taste were found to be further improved in Present Inventions (53) to (58) in which a specific relationship exists between the content of potassium and the content of sodium. Moreover, when a mass ratio of sodium/potassium was kept within a specific range, such products resulted in suppressing a stuffy smell from tomato ketchup, and also suppressing a foreign taste derived from potassium, and further bringing out fragrance of the ingredient after heating the ketchup in the microwave oven. Moreover, both good fresh feel and a good taste were kept in the tomato ketchup after heating the ketchup.

Preparation Example 4

Preparation of Tomato Ketchup-4

Tomato paste (manufactured by KAGOME Co., Ltd.), sodium chloride (NaCl, manufactured by Wako Pure Chemical Industries, Ltd.), potassium chloride (KCl, manufactured by Wako Pure Chemical Industries, Ltd.), sodium aspartate (manufactured by Kirin Kyowa Foods Company, Limited), brewed vinegar (manufactured by Mizkan Group Corporation), reduced sugar syrup (manufactured by Mitsubishi Shoji Foodtech Co., Ltd.), onion, spice, and water were blended in formulations described in Table 4 below (a unit of blending amount in Table 4: part by mass), the resultant mixture was sufficiently stirred and homogenized using a homogenizer (ULTRA DISPERSER LK-22, manufactured by YAMATO SCIENTIFIC CO., LTD.), and subjected to heat treatment at 90° C. for 5 minutes, or subjected to heat treatment for 5 minutes in a closed system after temperature reached 120° C., and thus various kinds of tomato ketchup were obtained (Present Inventions (59) to (67)).

TABLE 4

| Tomato Paste | Reduced sugar syrup | Brewed vinegar | Spice | Onion | Water | Potassium chloride | Sodium chloride | Sodium aspartate | Brix (mass %) | Saccharide (mass %) | Potassium (mass %) |
|---|---|---|---|---|---|---|---|---|---|---|---|
| 35.0 | 19.3 | 5.0 | 0.7 | 2.3 | 35.60 | 0.5 | 1.5 | 0.10 | 31 | 21 | 0.7 |
|  |  |  |  |  | 35.52 |  |  | 0.18 |  |  | 0.7 |
|  |  |  |  |  | 35.50 |  |  | 0.20 |  |  | 0.7 |
|  |  |  |  |  | 35.45 |  |  | 0.25 |  |  | 0.7 |
|  |  |  |  |  | 35.30 |  |  | 0.40 |  |  | 0.7 |
|  |  |  |  |  | 34.90 |  |  | 0.80 |  |  | 0.7 |
|  |  |  |  |  | 34.50 |  |  | 1.20 |  |  | 0.7 |
|  |  |  |  |  | 34.20 |  |  | 1.50 |  |  | 0.7 |
|  |  |  |  |  | 33.90 |  |  | 1.80 |  |  | 0.7 |

| Tomato Paste | Sodium (mass %) | Asprtic acid equivalent (mass %) | K/Saccharide (mass ratio) | Na/K (mass ratio) | Tomato ketchup | Formula (I) | Formula (II) | Fresh feeling 90° C. heating | Fresh feeling 120° C. heating |
|---|---|---|---|---|---|---|---|---|---|
| 35.0 | 0.6 | 0.08 | 0.033 | 0.09 | Present invention (59) | Y | Y | 6 | 4 |
|  | 0.6 | 0.14 | 0.033 | 0.09 | Present invention (60) | Y | Y | 7 | 7 |
|  | 0.6 | 0.15 | 0.033 | 0.90 | Present invention (61) | Y | Y | 7 | 7 |
|  | 0.6 | 0.19 | 0.033 | 0.90 | Present invention (62) | Y | Y | 7 | 7 |
|  | 0.7 | 0.30 | 0.033 | 0.93 | Present invention (63) | Y | Y | 8 | 7 |
|  | 0.7 | 0.60 | 0.033 | 1.0 | Present invention (64) | Y | Y | 8 | 8 |
|  | 0.8 | 0.90 | 0.033 | 1.1 | Comparative product (65) | Y | Y | 8 | 8 |
|  | 0.8 | 1.13 | 0.033 | 1.1 | Comparative product (66) | Y | Y | 7 | 7 |
|  | 0.8 | 1.35 | 0.033 | 1.2 | Comparative product (67) | Y | Y | 6 | 6 |

Testing Example 4

Sensory Evaluation of Tomato Ketchup-4

With regard to each of the tomato ketchup obtained in the above-described Preparation Example 4, fresh feel was evaluated based on the above-described evaluation criteria, respectively.

Table 4 above presents the results.

Table 4 shows that fresh feel was further enhanced in the tomato ketchup containing a predetermined amount of aspartic acid, in which the fresh feel was not adversely affected even after heating the ketchup at 120° C. in the closed system. In addition, unity of taste even after heating the ketchup at 120° C. in the closed system was excellent in Present Inventions (59) to (67).

The results described above show that a fresh flavor and taste of a raw tomato was found to be enhanced and also unity of taste was found to be excellent in the tomato ketchup according to the present invention.

Having described our invention as related to the present embodiments, it is our intention that the invention not be limited by any of the details of the description, unless otherwise specified, but rather be construed broadly within its spirit and scope as set out in the accompanying claims.

This application claims priority on Patent Application No. 2011-074227 filed in Japan on Mar. 30, 2011, which is entirely herein incorporated by reference.

The invention claimed is:

1. A tomato ketchup comprising the following components (A) to (C):
 (A) saccharide from 21 to 30% by mass,
 (B) potassium from 0.6 to 1.6% by mass, and
 (C) sodium from 0.2 to 1.2% by mass,
 wherein the content of the potassium with respect to the content of the saccharide, a mass ratio potassium/saccharide, is from 0.021 to 0.0762, and
 wherein the content of potassium x % by mass and the content of sodium y % by mass satisfy the formula (II):

$$-0.5x+0.8 \leq y \leq -0.9x+1.8, \text{ wherein } x>0, y>0 \quad \text{(II)}.$$

2. The tomato ketchup according to claim 1, wherein the content of sodium with respect to the content of potassium, a mass ratio sodium/potassium, is from 0.05 to 1.2.

3. The tomato ketchup according to claim 1, wherein the tomato ketchup comprises aspartic acid, a salt thereof, or a combination thereof in an amount of from 0.13 to 1.13% by mass in terms of an aspartic acid equivalent.

4. The tomato ketchup according to claim 1, wherein the tomato ketchup comprises at least one tomato raw material selected from the group consisting of a fresh tomato, a whole tomato, a diced tomato, tomato puree, tomato paste and tomato juice.

5. The tomato ketchup according to claim 2, wherein the tomato ketchup comprises aspartic acid or a salt thereof, or a combination thereof in an amount of from 0.13 to 1.13% by mass in terms of an aspartic acid equivalent.

6. The tomato ketchup according to claim 1, wherein the amount of a soluble solid content is from 25 to 50% by mass.

7. The tomato ketchup according to claim 1, wherein a tomato raw material is blended in at a concentration of from 10 to 80% by mass.

8. The tomato ketchup according to claim 1, wherein at least one component selected from the group consisting of a sugar, a sugar alcohol and a polysacharide is blended in at a concentration of from 10 to 40% by mass in total.

9. The tomato ketchup according to claim 1, wherein edible vinegar is blended in at a concentration of from 1 to 30% by mass.

* * * * *